UNITED STATES PATENT OFFICE.

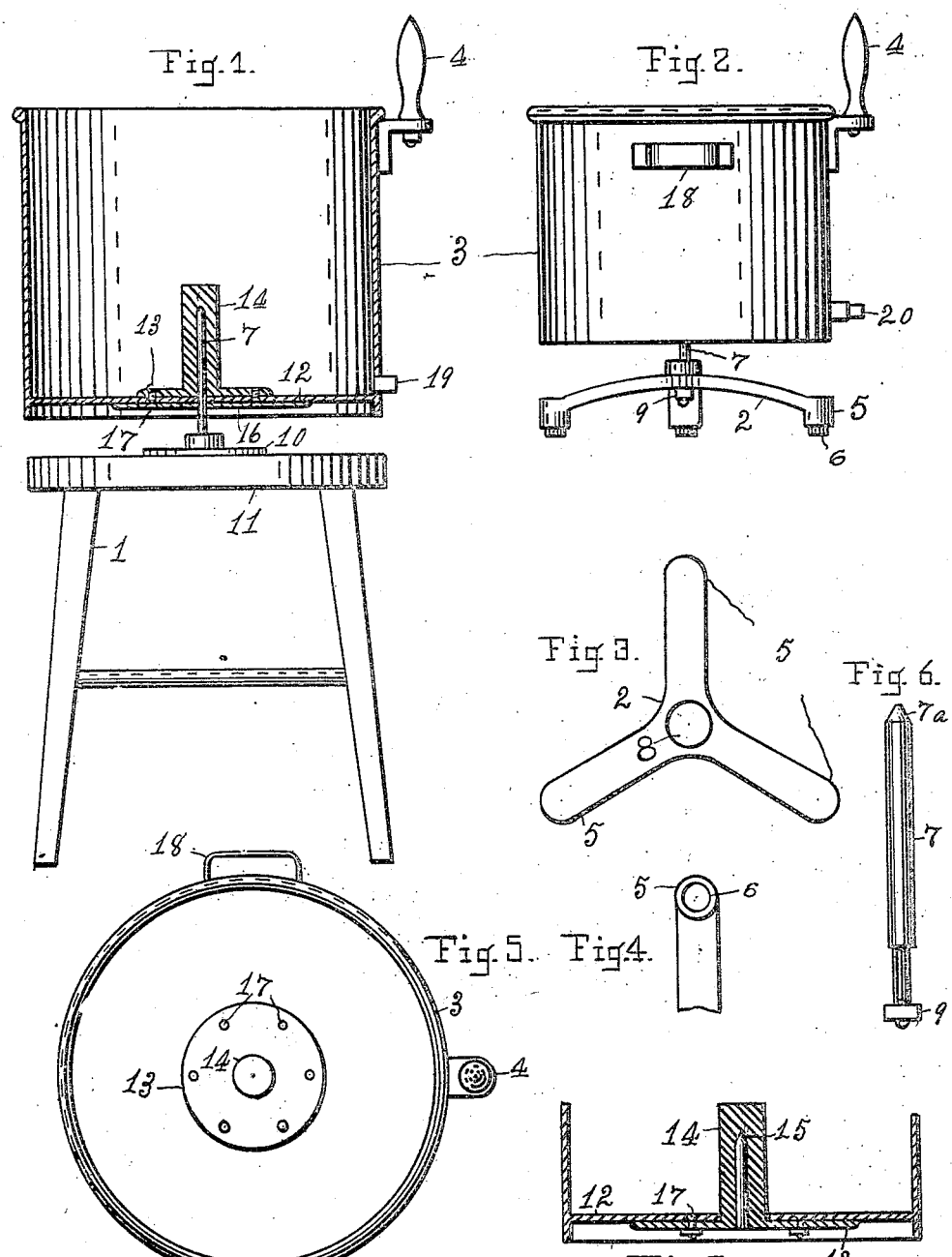

WILLIAM H. JONES AND KATE W. JONES, OF NEENAH, WISCONSIN.

DISH-WASHER.

1,050,467.

Specification of Letters Patent.

Patented Jan. 14, 1913.

Application filed May 20, 1912. Serial No. 698,491.

*To all whom it may concern:*

Be it known that we, WILLIAM H. JONES and KATE W. JONES, citizens of the United States, residing at Neenah, in the county of Winnebago and State of Wisconsin, have jointly invented a new and useful Dish-Washer, of which the following is a specification.

Our invention relates to a kitchen utensil for use in private families, hotels, boarding houses, restaurants, &c., and consists of a dish pan, or vessel having a cylindrical form, straight sides, a flat bottom and open top, its bottom being secured to a flange which is fitted to be revolved upon a vertically arranged shaft or spindle, the inside of the pan, aside from said flange and its centrally arranged boss, being devoid of any mechanism or obstruction, whereby space is provided for the dishes and utensils to be washed, and the object of the invention is, to provide a dish washer which has few parts, is low in its cost of construction, is easy to be operated by a woman or child, and that does not require more labor to care for and keep in a sanitary condition than it does to wash the dishes singly in the usual manner in which they have been washed, and the invention is shown in the accompanying drawing, in which,—

Figure 1 is a vertical section of the dish washer pan, and a side elevation of a stand upon which it is supported. Fig. 2 is a side elevation of a smaller pan and a modified stand upon which it is supported. Fig. 3 is a plan of the stand shown in Fig. 2. Fig. 4 is a plan of one of the legs of the stand shown in Fig. 3, showing its foot turned bottom side up. Fig. 5 is a top view of the dish pan. Fig. 6 is a side elevation of the spindle, upon an enlarged scale, upon which the pan is revolved. Fig. 7 is a vertical section of the lower part of the pan and showing a different method of attaching a supporting flange thereon from the manner shown in Fig. 1.

Similar numerals and letters indicate like parts in the several views.

The numerals 1 and 2, indicate stands upon which the pan 3, is mounted for revolution. The stand 1, is an ordinary four legged stool, which is adapted for supporting the larger sizes of the machines, of which usually three will be required for supplying the demands of the public, and 2, a cast metal tripod stand for use with the smaller sizes of pans in a sink or upon a table. Many families of two to six persons require a small dish washer that can be used upon a table, or in a sink, and for this purpose it is essential that a supporting stand is provided upon which the pan can be revolved, having sufficient weight, but not enough to be too heavy for the operator to handle easily, of large circular area for stability in operating it, and one that will furnish a suitable base. For supplying this requirement, the stand 2 has been devised. The objection to using the tripod stand with the larger sizes in a sink or upon a table is, that it brings the handle 4 at the top of the pan too high for the operator to work it easily. This stand is provided with feet 5, of which there may be three or more in which rubber plugs 6 are inserted into bores in the feet, whereby the metallic stand can be used in a sink or upon a table without scratching or defacing the sink or table. A spindle 7, is fitted to the bore 8 in the tripod, where it is secured with a nut 9, and extends upward, its upper end may be any suitable form but is made preferably in the form of the frustum of a cone as is shown at $7^a$, in Fig. 6.

The dish pan consists of a cylindrical vessel 3, having a flat bottom 12, a handle 4, by which it may be revolved, and a flange 13 or $13^a$, secured to the bottom, the flange having a boss 14, and a bore 15, into the boss for receiving the spindle. The spindle is to be made of the standard angle of the boring ends of the twist drills of commerce with its extreme point cut off sufficiently for providing a center upon which to support the spindle in the lathe while turning it, and the bore 15 is made with a standard ground drill. This flange may be secured upon the upper surface of the bottom 12, as in Fig. 1, with a flange 16, underneath it for strengthening the pan bottom, with bolts 17, passing through both the flanges and pan bottom. The flange is preferably secured to the under surface of the pan and bolted thereto with bolts 17, as in Fig. 7. An advantage in securing the flange to the pan bottom below, instead of above it is, that the weight of the dishes in the pan around the flange boss, will bear downward upon the sheet metal bottom and have a tendency to form a space between the bottom and flange for the accumulation of sediment and in time produce leakage between the bottom sheet and flange. With the flange below the bottom and the space around the boss made tight, a lasting and smooth surface around the pan is produced upon which to support the dishes. In both cases the boss 14 extends into the pan so as to permit the pan to rest flat upon a table by having the sides of the pan extend a short distance below the bottom 12. In extending the boss 14, upward, instead of downward, not only can the pan rest squarely upon a table, or like place, but any oil that may be used for lubricating the spindle in the bore 15, will not be likely to besmear the table or the person using the pan. The pan may be provided with handles 18, by which it can be lifted.

The manner of using the machine is as follows: The dishes are to be placed around the inside of the pan, the plates and saucers on edge, cups, knives and forks, spoons and small articles inside of the plates, and a sufficient quantity of soapy warm water poured over the contents until they are nearly or quite covered. The pan is then revolved, first in one direction and then the other, a suitable number of times. The dishes can then be taken out, rinsed and wiped, and another lot placed therein to be washed as before described. The used water is drawn off through an outlet 19 which is controlled by a plug 20.

Having described our invention and the manner of using it, what we claim and desire to secure by Letters Patent, is,—

A dish washer consisting of a cylindrical receptacle having a flat bottom, a centrally arranged cylindrical boss extending upward into said receptacle and having a central bore, a flange upon the lower end of said boss integral therewith, secured upon the under side of said bottom, a suitable stand upon which the receptacle may be revolved and a spindle extending upward from said stand into said boss.

WILLIAM H. JONES.
KATE W. JONES.

Witnesses:
C. A. MILLER,
C. M. ALBEE.